(12) United States Patent
Ye et al.

(10) Patent No.: US 9,160,560 B2
(45) Date of Patent: Oct. 13, 2015

(54) CSMA TIME SLOT PROVIDING AND OBTAINING METHOD AND DEVICE, NETWORKING METHOD AND DEVICE, AND SYSTEM

(71) Applicant: Huawei Technologies Co., Ltd., Shenzhen, Guangdong (CN)

(72) Inventors: Bucai Ye, Beijing (CN); Chunmei Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 13/931,021

(22) Filed: Jun. 28, 2013

(65) Prior Publication Data
US 2014/0003446 A1    Jan. 2, 2014

(30) Foreign Application Priority Data
Jun. 30, 2012  (CN) .......................... 2012 1 0222909

(51) Int. Cl.
*G01R 31/08* (2006.01)
*H04L 12/413* (2006.01)
*H04L 12/403* (2006.01)

(52) U.S. Cl.
CPC .......... *H04L 12/413* (2013.01); *H04L 12/4035* (2013.01)

(58) Field of Classification Search
CPC .............................. H04L 12/413; H04L 43/16
USPC ......................................................... 370/443
See application file for complete search history.

(56) References Cited

U.S. PATENT DOCUMENTS

| | | | |
|---|---|---|---|
| 2003/0231607 A1* | 12/2003 | Scanlon et al. | 370/338 |
| 2004/0072573 A1* | 4/2004 | Shvodian | 455/450 |
| 2007/0248072 A1 | 10/2007 | Kwon et al. | |
| 2012/0020336 A1 | 1/2012 | Bahr et al. | |
| 2012/0281717 A1 | 11/2012 | Vijayasankar et al. | |

FOREIGN PATENT DOCUMENTS

| | | |
|---|---|---|
| CN | 101405995 A | 4/2009 |
| CN | 102282904 A | 12/2011 |
| CN | 102413580 A | 4/2012 |

OTHER PUBLICATIONS

Extended European Search Report in corresponding European Patent Application No. 13174228.0 (Sep. 3, 2013).
Bachir et al., "MAC Essentials for Wireless Sensor Networks," *IEEE Communications Surveys & Tutorials*, vol. 12, No. 2, IEEE, New York, New York (2010).

* cited by examiner

*Primary Examiner* — Iqbal Zaidi
(74) *Attorney, Agent, or Firm* — Leydig, Voit & Mayer, Ltd.

(57) ABSTRACT

The present disclosure provides a CSMA time slot providing and obtaining method and device, a networking method and device, and a system. The CSMA time slot providing method includes: generating a beacon frame, where the beacon frame carries a CSMA time slot and attribute information used to identify an applicable device of the CSMA time slot; and sending the beacon frame and providing the CSMA time slot for the applicable device, so that the applicable device sends a packet by using the CSMA time slot. The CSMA time slot providing and obtaining method and device, the networking method and device, and the system provided by the present invention can designate an applicable device of a CSMA time slot.

10 Claims, 4 Drawing Sheets

CSMA TIME SLOT PROVIDING AND OBTAINING METHOD AND DEVICE, NETWORKING METHOD AND DEVICE, AND SYSTEM

CROSS-REFERENCE TO RELATED APPLICATIONS

This application claims priority to Chinese Patent Application No. 201210222909.2, filed on Jun. 30, 2012, which is hereby incorporated by reference in its entirety.

TECHNICAL FIELD

The present disclosure relates to a method for allocating a network resource, and in particular, to a CSMA time slot providing and obtaining method and device, a networking method and device, and a system, which belong to the field of communications technologies.

BACKGROUND

Carrier sense multiple access (Carrier Sense Multiple Access, CSMA) is a distributed medium access control protocol. Each site (node) in a network competes to send a data frame by using a CSMA time slot. FIG. 1 is a network architecture diagram of a typical communication network. As shown in FIG. 1, a concentrator, level-1 sites, level-2 sites, and level-3 sites that request to access the level-2 sites are included. In an ad hoc networking stage, the concentrator allocates a CSMA time slot, that is, carries a CSMA time slot shared by all the sites to upload data in a beacon frame, and delivers the beacon frame to the level-2 sites. All the level-3 sites obtain the CSMA time slot and perform carrier sensing, and can send an access-request packet to the level-2 sites that are requested to be accessed only when the CSMA time slot is idle.

It can be seen that, when the concentrator provides a CSMA time slot for the network sites in the foregoing manner, all the level-3 sites share the CSMA time slot, and when there are multiple level-3 sites requesting for access, it cannot be known and managed in advance that which level-3 site (level-3 sites) can successfully send an access-request packet to take priority to access the concentrator in the network. However, in some actual application scenarios, the concentrator expects to designate, according to a certain rule, level-3 sites having different time slots to access in different periods, for example, a level-3 site that accesses a certain designated level-2 site; therefore, when a CSMA time slot is provided, an applicable site of the CSMA time slot needs to be designated. However, a current CSMA time slot providing method cannot designate an applicable site of the CSMA time slot.

SUMMARY

Embodiments of the present invention provide a CSMA time slot providing and obtaining method and device, a networking method and device, and a system, which are used to provide a CSMA time slot that only can be used by a designated device.

According to a first aspect of the embodiments of the present invention, a CSMA time slot providing method is provided and includes:

generating a beacon frame, where the beacon frame carries a CSMA time slot and attribute information used to identify an applicable device of the CSMA time slot; and sending the beacon frame, and providing the CSMA time slot for the applicable device of the CSMA time slot, so that the applicable device of the CSMA time slot sends a packet by using the CSMA time slot.

According to a second aspect of the embodiments of the present invention, a CSMA time slot obtaining method is provided and includes:

receiving a beacon frame, where the beacon frame carries a CSMA time slot and attribute information used to identify an applicable device of the CSMA time slot; and parsing the beacon frame, and determining, according to the attribute information, whether itself belongs to the applicable device of the CSMA time slot, and if yes, obtaining the CSMA time slot, so as to send a packet by using the CSMA time slot.

According to a third aspect of the embodiments of the present invention, a CSMA time slot providing device is provided and includes:

a first generating module, configured to generate a beacon frame, where the beacon frame carries a CSMA time slot and attribute information used to identify an applicable device of the CSMA time slot; and a first sending module, configured to send the beacon frame, and provide the CSMA time slot for the applicable device of the CSMA time slot, so that the applicable device of the CSMA time slot sends a packet by using the CSMA time slot.

According to a fourth aspect of the embodiments of the present invention, a CSMA time slot obtaining device is provided and includes:

a receiving module, configured to receive a beacon frame, where the beacon frame carries a CSMA time slot and attribute information used to identify an applicable device of the CSMA time slot; and a parsing and obtaining module, configured to determine, according to the attribute information, whether itself belongs to the applicable device of the CSMA time slot, and if yes, obtain the CSMA time slot, so as to send a packet by using the CSMA time slot.

According to a fifth aspect of the embodiments of the present invention, a networking method is provided and includes:

separately configuring, according to a preset period, a CSMA time slot for at least two peripheral sites detected in a current period;

generating a beacon frame, where the beacon frame carries the CSMA time slot and attribute information of the CSMA time slot, and the attribute information is used to indicate that the CSMA time slot is applicable to a to-be-added device requesting to be added to a corresponding peripheral site;

sending the beacon frame, so that the device to be added to the corresponding peripheral site is added, according to the attribute information, to the peripheral site by using a corresponding CSMA time slot; and receiving a notification packet used to indicate whether a newly added device exists and reported by the at least two peripheral sites detected in the current period, and setting a peripheral site where a newly added device exists as a peripheral site to be detected in a next period.

According to a sixth aspect of the embodiments of the present invention, a networking device is provided and includes:

a time slot configuring module, configured to separately configure, according to a preset period, a CSMA time slot for at least two peripheral sites detected in a current period;

a second generating module, configured to generate a beacon frame, where the beacon frame carries the CSMA time slot and attribute information of the CSMA time slot, and the attribute information is used to indicate that the CSMA time slot is applicable to a to-be-added device requesting to be added to a corresponding peripheral site;

a second sending module, configured to send the beacon frame, so that the device to be added to the corresponding peripheral site is added, according to the attribute information, to the peripheral site by using a corresponding CSMA time slot; and a site configuring module, configured to receive a notification packet used to indicate whether a newly added device exists and reported by the at least two peripheral sites detected in the current period, and set a peripheral site where a newly added device exists as a peripheral site to be detected in a next period.

According to a seventh aspect of the embodiments of the present invention, a communication system is provided and includes a CSMA time slot providing device according to an embodiment of the present invention, and a CSMA time slot obtaining device according to an embodiment of the present invention.

According to the CSMA time slot providing and obtaining method and device, the networking method and device, and the system provided by the embodiments of the present invention, because the CSMA time slot and the attribute information used to identify the applicable device of the CSMA time slot are carried in the beacon frame, only the applicable device of the CSMA time slot that is designated by the attribute information can send a packet by using the CSMA time slot, so as to implement designation of an applicable scope of the CSMA time slot when the CSMA time slot is allocated.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and persons of ordinary skill in the art may further obtain other drawings according to these accompanying drawings without creative efforts.

DESCRIPTION OF EMBODIMENTS

Embodiment 1

Figure 2:
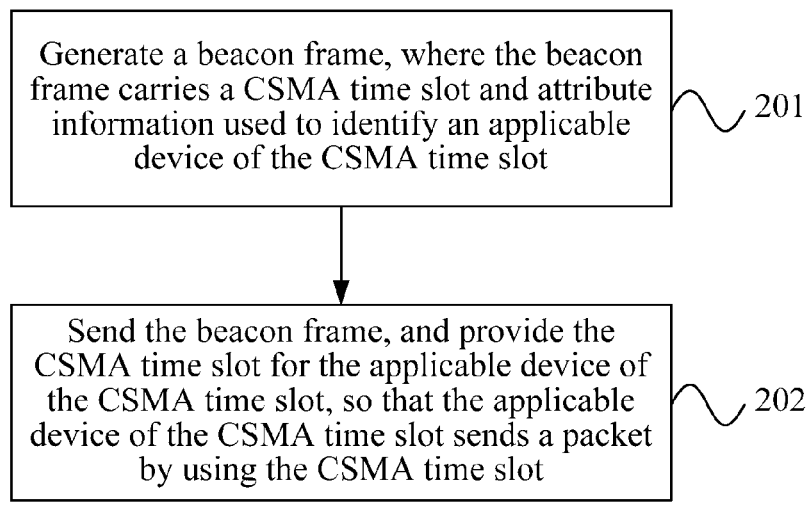
FIG. 2 is a schematic flowchart of a CSMA time slot providing method according to an embodiment of the present invention.

FIG. 2 is a schematic flowchart of a CSMA time slot providing method according to an embodiment of the present invention. As shown in FIG. 2, the CSMA time slot providing method includes:

201: Generate a beacon frame, where the beacon frame carries a CSMA time slot and attribute information used to identify an applicable device of the CSMA time slot.

202: Send the beacon frame, and provide the CSMA time slot for the applicable device of the CSMA time slot, so that the applicable device of the CSMA time slot sends a packet by using the CSMA time slot.

Figure 1:
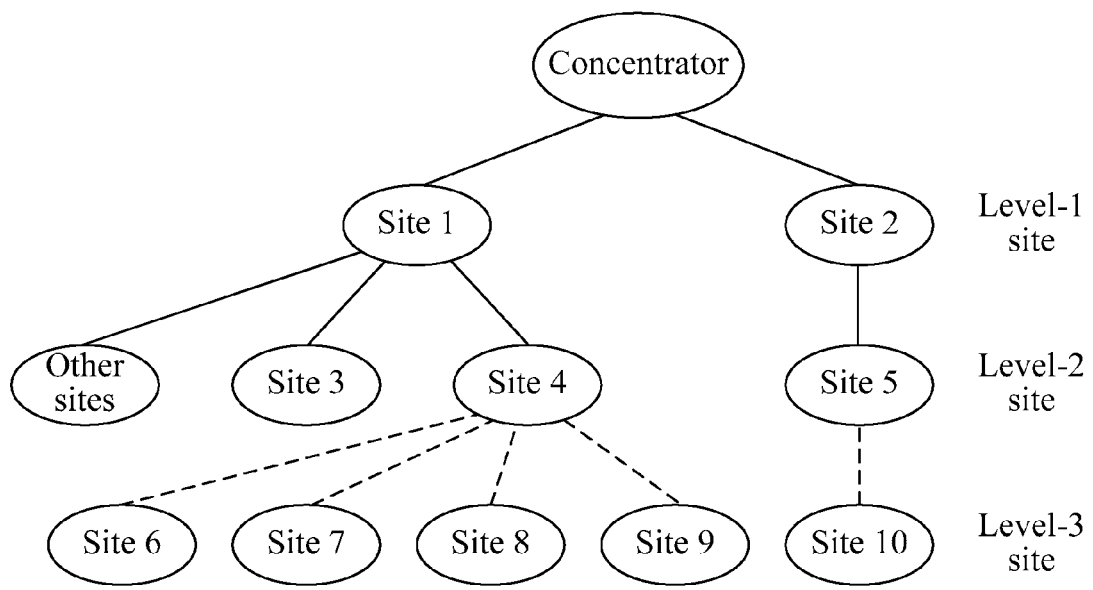
FIG. 1 is a network architecture diagram of a typical communication network.

Specifically, based on network architecture as shown in FIG. 1, in an ad hoc networking stage, an example that a concentrator performs the CSMA time slot providing method in this embodiment is taken to describe the technical solution of this embodiment in detail.

In the ad hoc networking stage, in each beacon period, the concentrator allocates a beacon frame time slot of the concentrator and a beacon frame time slot of a level-1 site, and arranges a beacon frame time slot of at least one level-2 site, so as to discover a level-3 site that requests for access, and needs to arrange a required CSMA time slot used to send a request packet by the level-3 site that requests for access to the level-2 site, and to report an access packet by the level-2 site to the level-1 site and by the level-1 site to the concentrator. For example, in a current beacon period, the concentrator detects whether a new level-3 site requests for access under a site 4 and a site 5 in level-2 sites, and if yes, allocates a beacon frame time slot for the site 4 and the site 5, and allocates a first CSMA time slot used by level-3 sites (including a site 6, a site 7, a site 8, and a site 9) to request to access the site 4 and a second CSMA time slot used by a level-3 site (including a site 10) to request to access the site 5. Specifically, a mapping relationship between the first CSMA time slot and the site 6, the site 7, the site 8, and the site 9 and a mapping relationship between the second CSMA time slot and the site 10 are implemented by carrying attribute information corresponding to the first CSMA time slot and attribute information corresponding to the second CSMA time slot in the beacon frame by the concentrator.

More specifically, a manner for carrying attribute information corresponding to a CSMA time slot in the beacon frame includes, for example, the following two forms, and Table 1 is an example of the beacon frame in the embodiment of the present invention.

TABLE 1

| Beacon frame time slot of | Beacon frame | Beacon frame | Beacon frame | First CSMA time slot | Beacon frame | Second CSMA time |

TABLE 1-continued

| the concentrator | time slot of the site 1 | time slot of the site 2 | time slot of the site 4 | (attribute information) | time slot of the site 5 | slot (attribute information) |
|---|---|---|---|---|---|---|

As shown in Table 1, the attribute information corresponding to the first CSMA time slot is that, for example, "an identifier of a packet receiver sending a packet by using the CSMA time slot is an identifier of the site 4", and the attribute information corresponding to the second CSMA time slot is that, for example, "an identifier of a packet receiver sending a packet by using the CSMA time slot is an identifier of the site 5".

After generating the beacon frame as shown in FIG. 1, according to the beacon frame time slot of the concentrator, the concentrator sends a beacon frame of the concentrator to the site 1 and the site 2, and after receiving the beacon frame, the site 1 parses the beacon frame, obtains the beacon frame time slot of the site 1, re-encapsulates the parsed beacon frame, and delivers the beacon frame to the site 4 according to the beacon frame time slot of the site 1; and similarly, after receiving the beacon frame, the site 2 parses the beacon frame, obtains the beacon frame time slot of the site 2, re-encapsulates the parsed beacon frame, and delivers the beacon frame to the site 5 according to the beacon frame time slot of the site 2. The site 4 and the site 5 broadcast the obtained beacon frame in a public channel.

The site 6, the site 7, the site 8, the site 9, and the site 10 obtain the beacon frame by monitoring the channel, and obtain, through parsing, the first CSMA time slot and the attribute information corresponding to the first CSMA time slot and the second CSMA time slot and the attribute information corresponding to the second CSMA time slot. Because the site 6, the site 7, the site 8, and the site 9 request to access the site 4, that is, when an access-request packet is sent, an identifier of a packet receiver is an identifier of the site 4, it is known, through determining, that the access-request packet may be uploaded by using the first CSMA time slot; and because the site 10 requests to access the site 5, that is, when an access-request packet is sent, an identifier of a packet receiver is an identifier of the site 5, it is known, through determining, that the access-request packet may be uploaded by using the second CSMA time slot.

According to the CSMA time slot providing method in the foregoing embodiment, because the CSMA time slot and the attribute information used to identify the applicable device of the CSMA time slot are carried in the beacon frame, only the applicable device of the CSMA time slot that is designated by the attribute information can send a packet by using the CSMA time slot, so as to implement designation of an applicable scope of the CSMA time slot when the CSMA time slot is allocated.

By designating the applicable scope of the CSMA time slot when the CSMA time slot is allocated, flexible allocation of the CSMA time slot is implemented, and flexibility and concentricity of network control and management are improved. For example, in the foregoing application scenario of this embodiment, by identifying the attribute information of the CSMA time slot, when a new site that requests for access exists under both the site 4 and the site 5, in each beacon period, a new site that successfully accesses the network through the site 4 and a new site that successfully accesses the network through the site 5 exist, so that the concentrator can accurately control whether there is a new site requesting for access under each level-2 site in each beacon period, so as to avoid that the concentrator only can detect one level-2 site where a new site that requests for access exists when all sites to be accessed share one CSMA time slot.

Furthermore, in the CSMA time slot providing method in the foregoing embodiment, although an example that two CSMA time slots and attribute information separately used to identify an applicable device of each CSMA time slot are carried in the beacon frame is taken for description in Table 1, the number of CSMA time slots and pieces of attribute information of the CSMA time slots that are carried in the beacon frame may also be one or more according to an actual requirement.

In addition, in the CSMA time slot providing method in the foregoing embodiment, an example of the ad hoc networking stage and the attribute information being an identifier of a packet receiver sending a packet by using the CSMA time slot is taken to describe the CSMA time slot providing method in this embodiment, which, however, is not intended to limit the technical solution of this embodiment. However, persons skilled in the art can understand that, for any other application scenario, the CSMA time slot providing method in this embodiment can be used, so as to implement allocating of a corresponding CSMA time slot for a device in a designated scope (conforming to a designated attribute). For example, the attribute information may further be an identifier or a group identifier or the like of an applicable device of the CSMA time slot, so that only a device corresponding to the identifier or the group identifier can send a packet by using a corresponding CSMA time slot.

Embodiment 2

Figure 3:
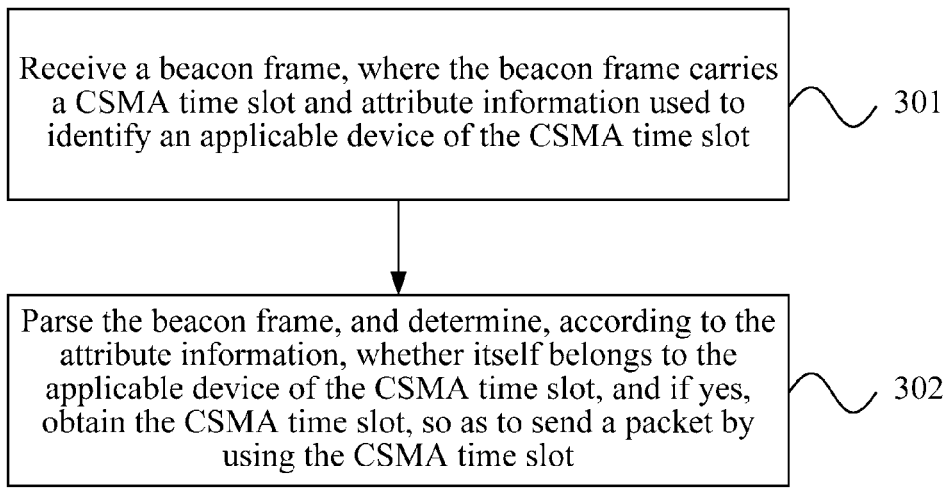
FIG. 3 is a schematic flowchart of a CSMA time slot obtaining method according to an embodiment of the present invention.

FIG. 3 is a schematic flowchart of a CSMA time slot obtaining method according to an embodiment of the present invention. As shown in FIG. 3, the CSMA time slot obtaining method includes:

301: Receive a beacon frame, where the beacon frame carries a CSMA time slot and attribute information used to identify an applicable device of the CSMA time slot.

302: Parse the beacon frame, and determine, according to the attribute information, whether itself belongs to the applicable device of the CSMA time slot, and if yes, obtain the CSMA time slot, so as to send a packet by using the CSMA time slot.

A method for receiving a beacon frame is, for example, receiving in a wired manner, receiving in a wireless manner, or obtaining through monitoring, which is not limited in the embodiment of the present invention.

A device (for example, a site 6, a site 7, a site 8, a site 9, and a site 10 as shown in FIG. 1) that receives the beacon frame obtains, through parsing, the CSMA time slot and the corresponding attribute information that are carried in the beacon frame, and determines, according to the attribute information, whether itself can use the CSMA time slot. Specifically, for example, because the site 6, the site 7, the site 8, and the site 9 request to access the site 4, that is, when an access-request packet is sent, an identifier of a packet receiver is an identifier of the site 4, it is known, through determining, that the access-request packet may be uploaded by using a first CSMA time slot; and because the site 10 requests to access a site 5, that is, when an access-request packet is sent, an identifier of a packet receiver is an identifier of the site 5, it is known, through determining, that the access-request packet may be uploaded by using a second CSMA time slot.

According to the CSMA time slot obtaining method in the foregoing embodiment, because the CSMA time slot and the attribute information used to identify the applicable device of the CSMA time slot are carried in the beacon frame, when receiving the beacon frame, a device determines, according to the attribute information, whether itself can send a packet by using the CSMA time slot, so as to implement designation of an applicable scope of the CSMA time slot when the CSMA time slot is allocated.

By designating the applicable scope of the CSMA time slot when the CSMA time slot is allocated, flexible allocation of the CSMA time slot is implemented, and flexibility and concentricity of network control and management are improved. For example, in an example of this embodiment with reference to FIG. 1, by identifying the attribute information of the CSMA time slot, when a new site that requests for access exists under both the site 4 and the site 5, in each beacon period, a new site that successfully accesses the network through the site 4 and a new site that successfully accesses the network through the site 5 exist, so that a concentrator can accurately control whether there is a new site requesting for access under each level-2 site in each beacon period, so as to avoid that the concentrator only can detect one level-2 site where a new site that requests for access exists when all sites to be accessed share one CSMA time slot.

Furthermore, in the CSMA time slot obtaining method in the foregoing embodiment, although an example that when two CSMA time slots and attribute information separately used to identify an applicable device of each CSMA time slot are carried in the beacon frame, a device receiving the beacon frame separately determines, according to the two pieces of attribute information, whether itself belongs to the applicable device of any one of the two CSMA time slots, and if yes, obtains a corresponding CSMA time slot and sends a packet by using the corresponding CSMA time slot is taken for description, the number of CSMA time slots and pieces of attribute information of the CSMA time slots that are carried in the beacon frame may also be one or more according to an actual requirement.

In addition, in the CSMA time slot obtaining method in the foregoing embodiment, an example of an ad hoc networking stage and the attribute information being an identifier of a packet receiver sending a packet by using the CSMA time slot is taken to describe the CSMA time slot providing method in this embodiment, which, however, is not intended to limit the technical solution of this embodiment. However, persons skilled in the art can understand that, for any other application scenario, the CSMA time slot obtaining method in this embodiment can be used, so as to implement allocating of a corresponding CSMA time slot for a device in a designated scope (conforming to a designated attribute). For example, the attribute information may further be an identifier or a group identifier or the like of an applicable device of the CSMA time slot, so that only a device corresponding to the identifier or the group identifier can send a packet by using a corresponding CSMA time slot.

Embodiment 3

Figure 4:
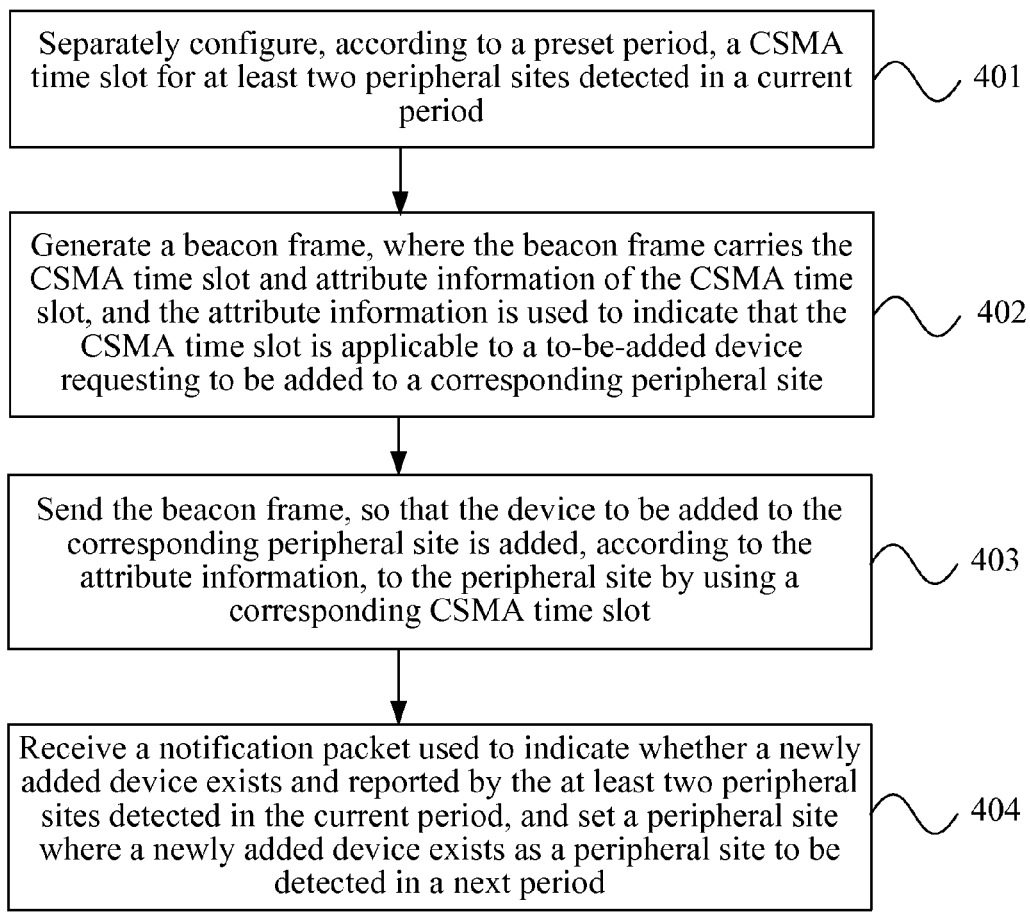
FIG. 4 is a schematic flowchart of a networking method according to an embodiment of the present invention.

FIG. 4 is a schematic flowchart of a networking method according to an embodiment of the present invention. As shown in FIG. 4, the networking method includes:

401: Separately configure, according to a preset period, a CSMA time slot for at least two peripheral sites detected in a current period.

402: Generate a beacon frame, where the beacon frame carries the CSMA time slot and attribute information of the CSMA time slot, and the attribute information is used to indicate that the CSMA time slot is applicable to a to-be-added device requesting to be added to a corresponding peripheral site.

403: Send the beacon frame, so that the device to be added to the corresponding peripheral site is added, according to the attribute information, to the peripheral site by using a corresponding CSMA time slot.

404: Receive a notification packet used to indicate whether a newly added device exists and reported by the at least two peripheral sites detected in the current period, and set a peripheral site where a newly added device exists as a peripheral site to be detected in a next period.

Figure 5:
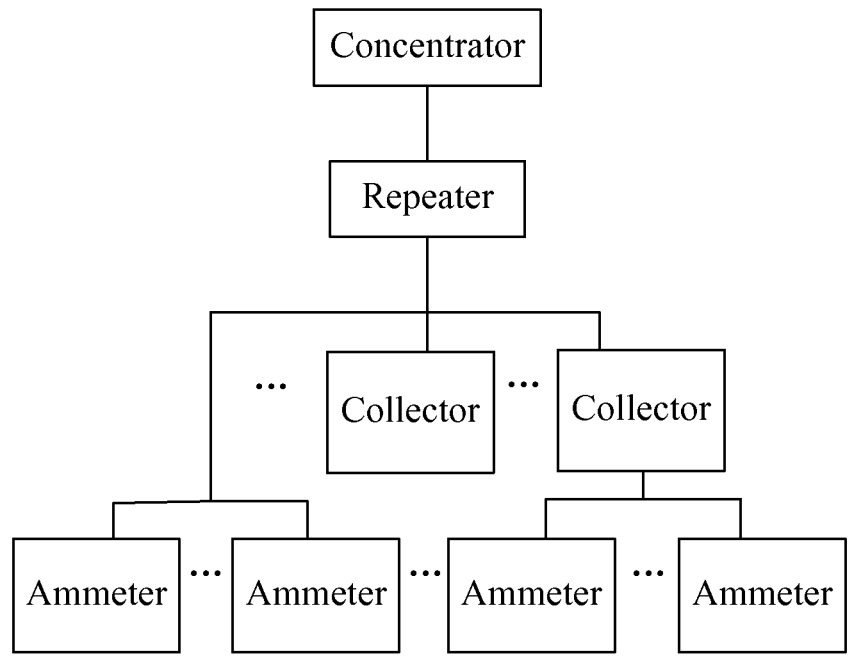
FIG. 5 is a network architecture diagram of a system for collecting power information.

Specifically, an example of a networking process of a system for collecting power information is taken for description. FIG. 5 is a network architecture diagram of a system for collecting power information. As shown in FIG. 5, a concentrator, a repeater, collectors, and ammeters are included. The concentrator is located near a cell transformer, and communicates with the repeater and the collectors through power lines; the repeater is responsible for data forwarding; and a collector is located in an ammeter box, and communicates with an ammeter through an RS-485 line, so as to collect data from the ammeter. In the system for collecting power information, the concentrator corresponds to a concentrator in FIG. 1, the repeater corresponds to a level-1 site (that is, a proxy site) in FIG. 1, the collector corresponds to a level-2 site (that is, a peripheral site) in FIG. 1, and the ammeter corresponds to a level-3 site in FIG. 1.

In a current networking process, in each beacon period, the concentrator arranges a beacon frame time slot of the concentrator, beacon frame time slots of all proxy sites, and a beacon frame time slot of at least one peripheral site through the beacon frame, and arranges a CSMA time slot shared by the whole network, so that after receiving the beacon frame, in the shared CSMA time slot, a site that is not added sends corresponding request information to the peripheral site through a power line, and a site of each level forwards the request information to the concentrator level by level; therefore, the concentrator knows a new site that requests to be added and implements site addition. In a next beacon period, the peripheral site is shifted in preset order. The number of sites that are not added under each peripheral site is generally not evenly distributed, for example, as shown in FIG. 1, no site that is not added exists under a site 3, four sites that are not added exist under a site 4, and one site that is not added exists under a site 5. Therefore, when this manner is adopted, networking efficiency is low.

In the networking method in this embodiment, in each beacon period, the concentrator arranges a beacon frame time slot of the concentrator, beacon frame time slots of all proxy sites (when the number of proxy sites is large, beacon frame time slots of only a part of proxy sites may also be arranged in each period in a shifting manner), and a beacon frame time slot of at least one peripheral site (an example of two peripheral sites is taken for description in the following) through the beacon frame, and separately allocates a corresponding CSMA time slot for the two peripheral sites, so that when a site that is not added exists under both the two peripheral sites, one of sites that are not added under each of the two peripheral sites can successfully send request information by using a corresponding CSMA time slot, so that the concentrator can accurately know a specific peripheral site under which a site that is not added exists and a specific peripheral site under which no site that is not added exists, and continually arrange a beacon frame time slot and a corresponding CSMA time slot for the peripheral site where a site that is not added exists in a next beacon period.

That the concentrator provides different CSMA time slots for a site that is not added under different peripheral sites is implemented by carrying a CSMA time slot and an attribute relationship corresponding to the CSMA time slot in the beacon frame, which is the same as the CSMA time slot providing method and the CSMA time slot obtaining method in the foregoing embodiments and is not repeatedly described herein. The attribute information is, for example, an identifier of a packet receiver, which matches with an identifier of a corresponding peripheral site.

According to the networking method in this embodiment, when allocating a CSMA time slot for a peripheral site, by carrying the attribute information of the CSMA time slot in the beacon frame, the concentrator implements allocating of different CSMA time slots for sites that are not added under different peripheral sites, so as to avoid occurrence of a collision because sites that are not added under a same peripheral site compete to use a same shared CSMA time slot and that the concentrator cannot accurately detect whether a site that is not added exists under each peripheral site. By continually allocating a corresponding time slot for a peripheral site where a site that is not added exists, which is known through detection, rapid access of a site that is not added is implemented, and networking efficiency is improved.

Figure 6:
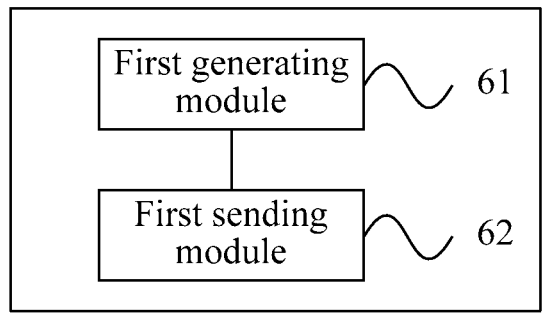
FIG. 6 is a schematic structural diagram of a CSMA time slot providing device according to an embodiment of the present invention.

FIG. 6 is a schematic structural diagram of a CSMA time slot providing device according to an embodiment of the present invention, and as shown in FIG. 6, the device includes:

a first generating module 61, configured to generate a beacon frame, where the beacon frame carries a CSMA time slot and attribute information used to identify an applicable device of the CSMA time slot; and a first sending module 62, configured to send the beacon frame, and provide the CSMA time slot for the applicable device of the CSMA time slot, so that the applicable device of the CSMA time slot sends a packet by using the CSMA time slot.

The CSMA time slot providing device in this embodiment is, for example, a concentrator in FIG. 1, of which a CSMA time slot providing procedure is the same as the CSMA time slot providing method in the foregoing embodiment and is not repeatedly described herein.

According to the CSMA time slot providing device in the foregoing embodiment, because the CSMA time slot and the attribute information used to identify the applicable device of the CSMA time slot are carried in the beacon frame, only the applicable device of the CSMA time slot that is designated by the attribute information can send a packet by using the CSMA time slot, so as to implement designation of an applicable scope of the CSMA time slot when the CSMA time slot is allocated.

Furthermore, in the CSMA time slot providing device in the foregoing embodiment, at least two CSMA time slots and attribute information separately used to identify an applicable device of each CSMA time slot are carried in the beacon frame.

Furthermore, in the CSMA time slot providing device in the foregoing embodiment, the attribute information is an identifier or a group identifier of an applicable device of the CSMA time slot, or an identifier of a packet receiver sending a packet by using the CSMA time slot.

Embodiment 5

Figure 7:
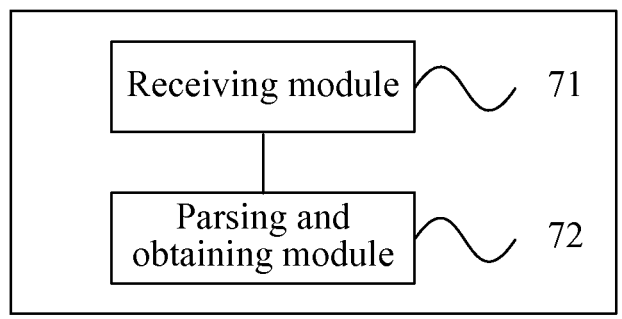
FIG. 7 is a schematic structural diagram of a CSMA time slot obtaining device according to an embodiment of the present invention.

FIG. 7 is a schematic structural diagram of a CSMA time slot obtaining device according to an embodiment of the present invention, and as shown in FIG. 7, the device includes:

a receiving module 71, configured to receive a beacon frame, where the beacon frame carries a CSMA time slot and attribute information used to identify an applicable device of the CSMA time slot; and a parsing and obtaining module 72, configured to determine, according to the attribute information, whether itself belongs to the applicable device of the CSMA time slot, and if yes, obtain the CSMA time slot, so as to send a packet by using the CSMA time slot.

The CSMA time slot obtaining device in this embodiment is, for example, sites 6 to 10 in FIG. 1, of which a CSMA time slot obtaining procedure is the same as the CSMA time slot obtaining method in the foregoing embodiment and is not repeatedly described herein.

According to the CSMA time slot obtaining device in the foregoing embodiment, because the CSMA time slot and the attribute information used to identify the applicable device of the CSMA time slot are carried in the beacon frame, when receiving the beacon frame, a device determines, according to the attribute information, whether itself can send a packet by using the CSMA time slot, so as to implement designation of an applicable scope of the CSMA time slot when the CSMA time slot is allocated.

Furthermore, in the CSMA time slot obtaining device in the foregoing embodiment, at least two CSMA time slots and at least two pieces of attribute information separately used to identify an applicable device of each CSMA time slot are carried in the beacon frame.

Correspondingly, the parsing and obtaining module is specifically configured to: separately determine, according to the at least two pieces of attribute information, whether itself belongs to an applicable device of any one of the at least two CSMA time slots, and if yes, obtain a corresponding CSMA time slot, so as to send a packet by using the corresponding CSMA time slot.

Furthermore, in the CSMA time slot obtaining device in the foregoing embodiment, the attribute information includes an identifier or a group identifier of an applicable device of the CSMA time slot, or an identifier of a packet receiver sending a packet by using the CSMA time slot.

Embodiment 6

Figure 8:
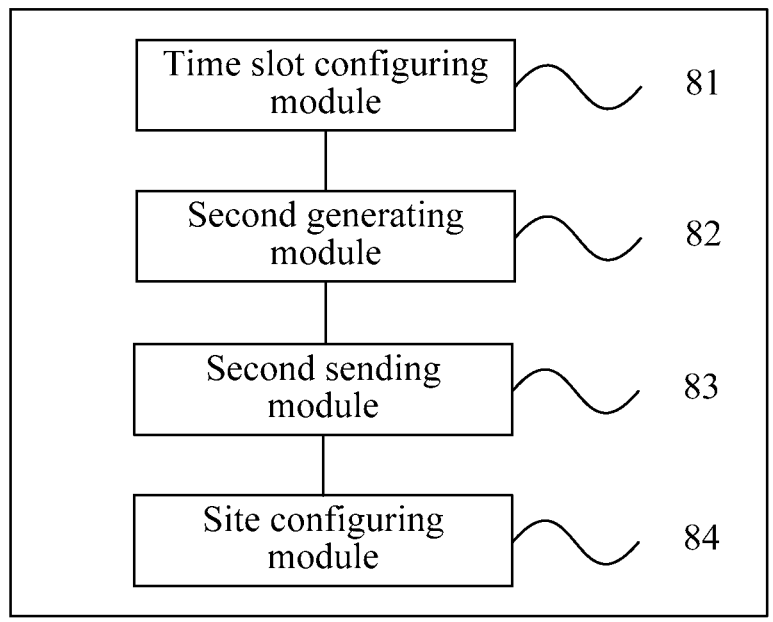
FIG. 8 is a schematic structural diagram of a networking device according to an embodiment of the present invention.

FIG. 8 is a schematic structural diagram of a networking device according to an embodiment of the present invention, and as shown in FIG. 8, the device includes:

a time slot configuring module 81, configured to separately configure, according to a preset period, a CSMA time slot for at least two peripheral sites detected in a current period;

a second generating module 82, configured to generate a beacon frame, where the beacon frame carries the CSMA time slot and attribute information of the CSMA time slot, and the attribute information is used to indicate that the CSMA time slot is applicable to a to-be-added device requesting to be added to a corresponding peripheral site;

a second sending module 83, configured to send the beacon frame, so that the device to be added to the corresponding peripheral site is added, according to the attribute information, to the peripheral site by using a corresponding CSMA time slot; and a site configuring module 84, configured to receive a notification packet used to indicate whether a newly added device exists and reported by the at least two peripheral sites detected in the current period, and set a peripheral site where a newly added device exists as a peripheral site to be detected in a next period.

A networking procedure performed by the networking device in this embodiment is the same as the networking method in the foregoing embodiment, which is not repeatedly described herein.

According to the networking device in this embodiment, when allocating a CSMA time slot for a peripheral site, by carrying the attribute information of the CSMA time slot in the beacon frame, a concentrator implements allocating of different CSMA time slots for sites that are not added under different peripheral sites, so as to avoid occurrence of a collision because sites that are not added under a same peripheral site compete to use a same shared CSMA time slot and that the concentrator cannot accurately detect whether a site that is not added exists under each peripheral site. By continually allocating a corresponding time slot for a peripheral site where a site that is not added exists, which is known through detection, rapid access of a site that is not added is implemented, and networking efficiency is improved.

Furthermore, in the networking device in the foregoing embodiment, the attribute information includes an identifier of a packet receiver, which matches with an identifier of a corresponding peripheral site.

Embodiment 7

Figure 9:
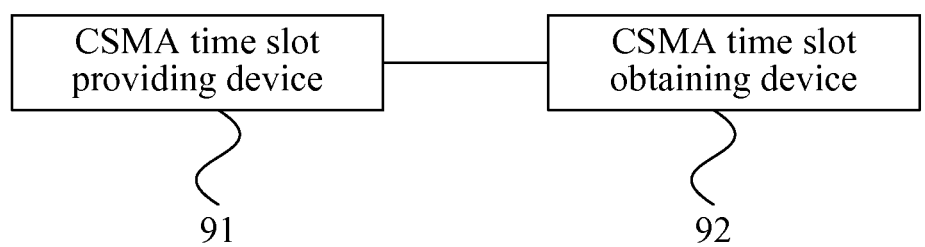
FIG. 9 is a systematic architecture diagram of a communication system according to an embodiment of the present invention.

FIG. 9 is a system architecture diagram of a communication system according to an embodiment of the present invention. As shown in FIG. 9, the communication system includes a CSMA time slot providing device 91 in the foregoing embodiment and a CSMA time slot obtaining device 92 in the foregoing embodiment.

In the communication system in this embodiment, a CSMA time slot providing procedure and a CSMA time slot obtaining procedure are the same as the working procedures of the CSMA time slot providing device and the CSMA time slot obtaining device in the foregoing embodiments, and are not repeatedly described herein.

According to the communication system in this embodiment, because the CSMA time slot and the attribute information used to identify the applicable device of the CSMA time slot are carried in the beacon frame, only the applicable device of the CSMA time slot that is designated by the attribute information can send a packet by using the CSMA time slot, so as to implement designation of an applicable scope of the CSMA time slot when the CSMA time slot is allocated.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to part of the technical features of the technical solutions described in the foregoing embodiments; however, these modifications or replacements do not make the essence of the corresponding technical solutions depart from the spirit and scope of the technical solutions of the embodiments of the present invention.

What is claimed is:

1. A method of providing a carrier sense multiple access (CSMA) time slot in a hierarchical communication network, comprising:
   generating at least one beacon frame within a beacon period, wherein the at least one beacon frame carries information on a CSMA time slot and an attribute information used to identify an applicable device of the CSMA time slot; and
   sending the beacon frame to one or more intermediary network devices that parse, re-encapsulate, and broadcast the re-encapsulated beacon frame within the beacon period, and providing the CSMA time slot for the applicable device, so that the applicable device sends a packet by using the CSMA time slot,
   wherein the at least one beacon frame carries information on at least two CSMA time slots and attribute information separately used to identify an applicable device of each CSMA time slot.

2. The method according to claim 1, wherein the attribute information is an identifier or a group identifier of the applicable device of the CSMA time slot, or an identifier of a packet receiver sending a packet by using the CSMA time slot.

3. A method of obtaining a carrier sense multiple access (CSMA) time slot, in a hierarchical communication network, comprising:
   receiving a re-encapsulated beacon frame, wherein the beacon frame carries a CSMA time slot and attribute information used to identify an applicable device of the CSMA time slot; and
   parsing the re-encapsulated beacon frame, and determining, according to the attribute information, whether the CSMA time slot belongs to the applicable device, and if the CSMA time slot does belong to the applicable device, obtaining the CSMA time slot, so as to send a packet by using the CSMA time slot,
   wherein the re-encapsulated beacon frame carries at least two CSMA time slots and at least two pieces of attribute information separately used to identify an applicable device of each CSMA time slot; and correspondingly, the determining, according to the attribute information, whether the CSMA time slot belongs to the applicable device of the CSMA time slot, comprises: separately determining, according to the at least two pieces of attribute information, whether the CSMA time slot belongs to an applicable device of any one of the at least two CSMA time slots, and if the CSMA time slot does belong to the applicable device of any one of the at least two CSMA time slots, obtaining a corresponding CSMA time slot, so as to send a packet by using the corresponding CSMA time slot.

4. The method according to claim 3, wherein the attribute information comprises an identifier or a group identifier of the applicable device of the CSMA time slot, or an identifier of a packet receiver sending a packet by using the CSMA time slot.

5. A network device in a hierarchical communication network that provides a carrier sense multiple access (CSMA) time slot, comprising: a first generating module, configured to generate beacon frames for intermediary sites in a beacon period, wherein at least one beacon frame carries a CSMA time slot and attribute information used to identify an applicable device of the CSMA time slot; and a first sending module, configured to send the at least one beacon frame, and provide the CSMA time slot for the applicable device, so that the applicable device sends a packet by using the CSMA time slot,
  wherein at least one beacon frame carries at least two CSMA time slots and attribute information separately used to identify an applicable device of each CSMA time slot.

6. The device according to claim 5, wherein the attribute information is an identifier or a group identifier of the applicable device of the CSMA time slot, or an identifier of a packet receiver sending a packet by using the CSMA time slot.

7. A network device that obtains a carrier sense multiple access (CSMA) time slot in a hierarchical communication network, comprising:
  a receiving module, configured to receive a re-encapsulated beacon frame, wherein the beacon frame carries a CSMA time slot and attribute information used to identify an applicable device of the CSMA time slot; and
  a parsing and obtaining module, configured to determine, according to the attribute information, whether the CSMA time slot belongs to the applicable device, and if the CSMA time slot does belong to the applicable device, obtain the CSMA time slot, so as to send a packet by using the CSMA time slot,
  wherein the re-encapsulated beacon frame carries at least two CSMA time slots and at least two pieces of attribute information separately used to identify an applicable device of each CSMA time slot; and correspondingly, the parsing and obtaining module is configured to: separately determine, according to the at least two pieces of attribute information, whether the CSMA time slot belongs to an applicable device of any one of the at least two CSMA time slots, and if yes, obtain a corresponding CSMA time slot, so as to send a packet by using the corresponding CSMA time slot.

8. The network device according to claim 7, wherein the attribute information comprises an identifier or a group identifier of the applicable device of the CSMA time slot, or an identifier of a packet receiver sending a packet by using the CSMA time slot.

9. A networking method in a communication network using a carrier sense multiple access (CSMA) protocol, comprising:
  separately configuring, according to a preset period, a CSMA time slot for at least two peripheral sites detected in a current period;
  generating a beacon frame, wherein the beacon frame carries the CSMA time slot and attribute information of the CSMA time slot, and the attribute information is used to indicate that the CSMA time slot is applicable to a to-be-added device requesting to be added to a corresponding peripheral site;
  sending the beacon frame, so that the device to be added to the corresponding peripheral site is added, according to the attribute information, to the peripheral site by using a corresponding CSMA time slot; and
  receiving a notification packet used to indicate whether a newly added device exists and reported by the at least two peripheral sites detected in the current period, and setting a peripheral site where a newly added device exists as a peripheral site to be detected in a next period,
  wherein the attribute information comprises an identifier of a packet receiver, which matches with an identifier of a corresponding peripheral site.

10. A network device that uses a carrier sense multiple access (CSMA) protocol, comprising:
  a time slot configuring module, configured to separately configure, according to a preset period, a CSMA time slot for at least two peripheral sites detected in a current period;
  a second generating module, configured to generate a beacon frame, wherein the beacon frame carries the CSMA time slot and attribute information of the CSMA time slot, and the attribute information is used to indicate that the CSMA time slot is applicable to a to-be-added device requesting to be added to a corresponding peripheral site;
  a second sending module, configured to send the beacon frame, so that the device to be added to the corresponding peripheral site is added, according to the attribute information, to the peripheral site by using a corresponding CSMA time slot; and
  a site configuring module, configured to receive a notification packet used to indicate whether a newly added device exists and reported by the at least two peripheral sites detected in the current period, and set a peripheral site where a newly added device exists as a peripheral site to be detected in a next period,
  wherein the attribute information comprises an identifier of a packet receiver, which matches with an identifier of a corresponding peripheral site.

* * * * *